US009979004B2

(12) United States Patent
Yoshida et al.

(10) Patent No.: US 9,979,004 B2
(45) Date of Patent: May 22, 2018

(54) CLAD MATERIAL

(75) Inventors: Kentarou Yoshida, Osaka (JP); Daisaku Arizono, Osaka (JP); Syuji Yoshida, Osaka (JP); Hayato Kita, Osaka (JP); Kouichi Takeuchi, Osaka (JP); Masayuki Shibuya, Osaka (JP); Hideya Kaminaka, Osaka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 899 days.

(21) Appl. No.: 13/701,230

(22) PCT Filed: Jun. 2, 2011

(86) PCT No.: PCT/JP2011/062658
§ 371 (c)(1),
(2), (4) Date: Feb. 6, 2013

(87) PCT Pub. No.: WO2011/152478
PCT Pub. Date: Dec. 8, 2011

(65) Prior Publication Data
US 2013/0209874 A1    Aug. 15, 2013

(30) Foreign Application Priority Data

Jun. 2, 2010 (JP) .................................. 2010-127304
Dec. 10, 2010 (JP) .................................. 2010-275362

(51) Int. Cl.
| B32B 15/01 | (2006.01) |
| H01M 2/26 | (2006.01) |
| B23K 20/04 | (2006.01) |
| B23K 11/00 | (2006.01) |
| B23K 11/11 | (2006.01) |

(Continued)

(52) U.S. Cl.
CPC ............. *H01M 2/26* (2013.01); *B23K 11/002* (2013.01); *B23K 11/115* (2013.01); *B23K 20/04* (2013.01); *B23K 20/233* (2013.01); *B32B 15/01* (2013.01); *C22F 1/08* (2013.01); *B23K 2201/28* (2013.01); *B23K 2201/38* (2013.01);
(Continued)

(58) Field of Classification Search
CPC ....................................................... B32B 15/01
USPC ........................................................... 428/675
See application file for complete search history.

(56) References Cited

FOREIGN PATENT DOCUMENTS

| JP | 63-143858 | 9/1988 |
| JP | 06-23572 | 2/1994 |

(Continued)

OTHER PUBLICATIONS

JPO Machine Translation of Abe et al., JP H06-23572, accessed Mar. 9, 2015.*

(Continued)

*Primary Examiner* — Humera N Sheikh
*Assistant Examiner* — Xiaobei Wang
(74) *Attorney, Agent, or Firm* — Clark & Brody

(57) ABSTRACT

The clad material comprises outer layers each consisting of Ni or Ni alloy and a base layer consisting of Cu or Cu alloy, and is characterized in that peeling-off at a clad boundary is not recognized in cross section observation made after the clad material has been subjected to a 90° reverse bend test ten times, and the number of reverse bend cycles before rupture is 17 cycles or more. The clad material has with both of excellent corrosion resistance against electrolytic solution and high electric conductivity.

12 Claims, 7 Drawing Sheets

(51) Int. Cl.
*B23K 20/233* (2006.01)
*C22F 1/08* (2006.01)
*B23K 101/28* (2006.01)
*B23K 101/38* (2006.01)
*B23K 103/12* (2006.01)
*B23K 103/18* (2006.01)

(52) U.S. Cl.
CPC ...... *B23K 2203/12* (2013.01); *B23K 2203/18* (2013.01); *B23K 2203/26* (2015.10)

(56) References Cited

FOREIGN PATENT DOCUMENTS

| | | |
|---|---|---|
| JP | 11-297300 | 10/1999 |
| JP | 2001-176491 | 6/2001 |
| JP | 2003-203622 | 7/2003 |
| JP | 2004-63132 | 2/2004 |
| JP | 2004-127599 | 4/2004 |
| JP | 2006-139987 | * 6/2006 |

OTHER PUBLICATIONS

JPO Machine Translation of Furukawa, JP 2001-176491, accessed Mar. 9, 2015.*
Technology Development of Lithium Battery for Fuel Cell Automobile Etc., Mar. 2005, Issued by New Energy and Industrial Technology Development Organization.

* cited by examiner

Figure 1 EXPERIMENTAL METHOD (SERIES WELDING METHOD)

DIFFUSION ANNEALING TEMPERATURE (°C)

CLAD MATERIAL

TECHNICAL FIELD

The present invention relates to a clad material.

BACKGROUND ART

Secondary batteries have been used in various technical fields such as hybrid vehicles, power tools, power assisted bicycles, cellular phones, and personal computers. This is because the secondary batteries such as lithium-ion batteries, nickel-hydrogen batteries, and nickel-cadmium batteries can be used repetitively by being charged. Each of these secondary batteries generally includes a Ni-plated iron-made or stainless steel-made can or an outer sheath material consisting of a laminated film, an electrolytic solution (electrolyte) accommodated in the outer sheath material, positive and negative electrode bands to which an active material is applied, a separator, and positive and negative electrode terminals. In the secondary battery, a laminated body formed by laminating the positive electrode band, the separator, and the negative electrode band in that order is used as a power generating body, and usually, a member formed by winding this laminated body is housed in the outer sheath material and enclosed in a state of being immersed in the electrolytic solution. The positive electrode band and negative electrode band are connected to a positive electrode lead and a negative electrode lead (both of these are collectively referred to as an "electrode lead") via the positive electrode terminal and the negative electrode terminal, respectively. In the secondary battery, power generation or charging is performed by the giving and taking of electrons performed by the power generating body immersed in the electrolytic solution in the outer sheath material.

In recent years, the performance of equipment using the secondary battery has increased, and the application range thereof has extended. Therefore, further miniaturization, improvement in heavy-current charging/discharging characteristics, and the like of the secondary battery have been required. To achieve these characteristics, the electrode lead has been required to be formed of a thin plate. However, if the electrode lead is formed of a thin plate, the cross-sectional area decreases, and the electrical resistance increases, which poses a problem of increased loss of electrical energy. In particular, in the application in which the heavy-current charging/discharging characteristics are required, Joule heat generation increases when a heavy current is caused to flow, so that there are fears of thermal effect on organic members, degeneration of the electrolyte, and the like.

As the electrode lead, Ni is preferably used from the viewpoint of corrosion resistance against electrolytic solution; however, Ni is a material having high electrical resistance. On the other hand, materials such as copper, aluminum, and silver each have low electrical resistance; however, copper and aluminum are difficult to be subjected to resistance welding, and silver is an expensive element. Therefore, the use of any of these materials increases the production cost.

To solve these problems, Patent Document 1 proposes a technique in which a clad plate formed of Ni—Cu—Ni having high corrosion resistance is applied to a secondary battery.

Patent Document 2 proposes a lead material for battery having a laminated structure of a weld layer consisting of Ni, Ni alloy, or Fe alloy, and a base layer consisting of at least Cu or heat-resisting Cu alloy. Patent Document 2 discloses, as a specific example, a thin lead material for battery having a total thickness of 0.06 to 0.5 mm.

Non Patent Document 1 shows a specific example in which a clad plate formed of Ni—Cu—Ni is used as a battery terminal and an electrode lead (connecting bar).

Patent Document 3 discloses an invention relating to a production method for a clad bar material consisting of copper or copper alloy though the material quality thereof is different. In Patent Document 3, there is described a method in which after a laminated material has been heated at a predetermined temperature, the material is hot-rolled at a working ratio of 60% or more to produce metallic joint at the clad boundary.

LIST OF PRIOR ART DOCUMENT(S)

Patent Document

[Patent Document 1] JP63-143858U
[Patent Document 2] JP11-297300A
[Patent Document 3] JP6-23572A Non Patent Document

[Non Patent Document 1] 2003-2004 Result Reports "Technology Development of Lithium Battery for Fuel Cell Automobile Etc. Technology Development of Onboard Lithium Battery (Technology Development of Onboard Lithium Battery of Technology Development of Lithium Battery for Fuel Cell Automobile Etc.)" March in 2005, Issued by New Energy and Industrial Technology Development Organization (Independent Administrative Agency) (Consignee: k.k. GS Yuasa Corporation), p. 110

DISCLOSURE OF THE INVENTION

Problems to be Solved by the Invention

The present inventors prepared an Ni—Cu—Ni clad material pursuant to the method described in the above-described documents, and could reproduce the high electric conductivity (low resistance) as shown in the documents. However, it was found that if resistance welding is performed, a portion in which good joining can be attained and a portion in which resistance welding cannot be performed are unevenly distributed, and for some materials, heat generates excessively at the time of resistance welding, and the material to be joined yields melting loss. Also, it was found that, in some cases, such a clad material peels off at the clad boundary, for example, at the time of bending work. These problems were confirmed even in the material that was produced on an experimental basis by adopting the conditions used for the production of other clad materials described in Patent Document 3.

An objective of the present invention is provide a clad material that is provided with both of excellent corrosion resistance against electrolytic solution and high electric conductivity, has excellent weldability in resistance welding, and does not peel off at the clad boundary at the time of bending work.

Means for Solving the Problems

The present inventors earnestly conducted studies on the above-described problems, and obtained findings described below.

A clad material in which the thickness of an outer layer consisting of Ni or Ni alloy (hereinafter, referred simply as to "outer layer") varies greatly is liable to produce a poor weld. The reason for this is that, for example, in a portion in which the outer layer is excessively thick, heat generates excessively at the time of spot resistance welding, and the material to be joined yields melting loss. On the other hand, in a portion in which the outer layer is thin, heat is less liable to generate because of small resistance value, and a poor weld is liable to be produced. Therefore, the variations in outer layer thickness must be as small as possible.

Even for the clad material in which the variations in outer layer thickness are small, if oxides are present excessively and/or voids (specifically, Kirkendall voids) are present at the clad boundary, a poor weld is liable to be produced. The reason for this is thought to be as described below. If oxides and/or voids are present at the clad boundary, the area fraction of the metal-to-metal connection portion at the boundary decreases, and the joint strength decreases. Therefore, cracks are generated at the boundary by thermal shock at the welding time, and the material sometimes peels off.

In particular, when a clad material in which oxides and/or voids are present excessively at the boundary is subjected to rolling or the like working at a high working ratio, the boundary at which oxides and/or voids are present, the outer layer is extended and thinned as compared with the boundary at which metals are joined to each other.

FIG. 2 is a microphotograph of a clad material in which the thickness thereof is about 100 μm and the variations in outer layer thickness are small, and FIG. 3 is a microphotograph of a clad material in which the thickness thereof is about 100 μm and the variations in outer layer thickness are large. As shown in FIGS. 2 and 3, for the material in which the variations in outer layer thickness are large, the outer layer thickness does not stabilize on the whole as compared with the clad material in which the variations in outer layer thickness are small, and a portion in which the Cu layer is exposed is produced Usually, the clad materials are lapped on and joined to each other after oxides adhering to the surface have been removed by grinding the joint surface. When coming into contact with the atmosphere, the metal surface is easily oxidized, and oxygen and/or moisture is adsorbed. Furthermore, since lapping is performed in the atmosphere, oxygen and/or moisture remains in a gap between the plates constituting the clad material. Because of these situations, it is difficult to join the clad materials in the state in which oxides have been removed completely from the metal surface.

FIG. 4 is a microphotograph of a cross section of a clad material having a thickness of about 500 μm, and FIG. 5 is a microphotograph taken after the clad material shown in FIG. 4 has been subjected to predetermined etching.

As seen from FIGS. 4 and 5, the presence of oxides and/or voids at the clad boundary can be confirmed by specific etching. The confirming method is explained later in detail. The oxides are melted by etching, and form vacancies, so that the presence situation of oxides at the boundary can be grasped from the occurrence situation of vacancies. Also, the voids can be observed clearly because the metal around the void is melted selectively. The material shown in FIG. 3 was subjected to predetermined etching, and the cross section thereof was observed. As a result, it was found that large amounts of vacancies were produced at the location at which the Cu layer was exposed.

It was found that even in the case where oxides are not present at the clad boundary and vacancies are not produced, the clad material sometimes peels off at the time of bending work. The reason for this is that in the case where oxygen does not diffuse and disappear sufficiently in the process in which the oxides at the clad boundary decompose, and oxygen diffuses and disappears in the Cu metal, a portion in which the oxygen concentration is high is present in the Cu layer in the vicinity of the clad boundary, and this portion cracks and peels off when being hardened and subject to stresses.

On the other hand, even in the case where oxides are decomposed and oxygen is diffused sufficiently by diffusion heat treatment, in some cases, voids are produced on the Cu side just close to the clad boundary, and the joint strength decreases. In the case where the temperature of diffusion heat treatment is high, a difference between the rate of Ni diffusion into Cu and the rate of Cu diffusion into Ni increases, and such a phenomenon is liable to occur. If the amount of Cu diffusion from the Cu side to the Ni side and the amount of Ni diffusion from the Ni side to the Cu side differ greatly from each other, voids (Kirkendall voids) are produced at a position on the Cu side of the boundary. For example, as shown in FIG. 8, in the cross section of the clad material subjected to diffusion heat treatment at 950° C., voids are sometimes produced. When such voids are produced, the joint strength decreases and a poor weld is produced as described before. As for the conditions of diffusion heat treatment, temperature and time should be set so that voids caused by the Kirkendall effect are not produced in large amounts.

The present invention is based on the above-described findings, and the gists thereof are clad materials described in the following items (1) to (8).

(1) A clad material including outer layers each consisting of Ni or Ni alloy and a base layer consisting of Cu or Cu alloy, wherein peeling-off at a clad boundary is not recognized in cross section observation made after the clad material has been subjected to a 90° reverse bend test ten times, and the number of reverse bend cycles before rupture is 17 cycles or more.

(2) A clad material which includes outer layers each consisting of Ni or Ni alloy and a base layer consisting of Cu or Cu alloy, the clad material having the total thickness of more than 0.2 mm, wherein peeling-off at a clad boundary is not recognized in visual cross section observation made after the clad material has been subjected to a 90° bend test with the bend radius being two times the clad material thickness.

(3) A clad material including outer layers each consisting of Ni or Ni alloy and a base layer consisting of Cu or Cu alloy, wherein the peel strength of Ni—Cu is 4 N/mm or higher.

(4) The clad material described in any one of items (1) to (3), wherein the porosity by which the presence of joint boundary can be confirmed by etching the clad material with nital solution is 20% or less.

(5) The clad material described in any one of items (1) to (4), wherein the coefficient of variation in outer layer thickness is 5 or less.

(6) The clad material described in any one of items (1) to (5), wherein a Ni layer having a thickness of 10 μm or smaller is formed in the cut cross section of the clad material.

(7) The clad material described in any one of items (1) to (6), wherein the clad material is produced by lapping the outer layers each consisting of Ni or Ni alloy on the base layer consisting of Cu or Cu alloy, by performing joint rolling under the conditions satisfying the relationship expressed by Formula (1), by holding the rolled material at a temperature not lower than 650° C. and not higher than 975° C. for a time period not shorter than 10 minutes and not longer than 8 hours, by performing heat treatment for diffusing and eliminating oxides that are present at the boundary, and then performing hot working at least one time:

$$T \geq -10 \cdot R + 300 \quad (1)$$

where T is rolling temperature (° C.) and R is draft (%).

(8) The clad material described in item (7), wherein the joint rolling is performed under the conditions satisfying the relationship expressed by Formula (2):

$$T \geq -17.8 \cdot R + 1084 \quad (2)$$

where T is rolling temperature (° C.) and R is draft (%).

Advantageous Effect(s) of the Invention

The clad material of the present invention is provided with both of excellent corrosion resistance against electrolytic solution and high electric conductivity, has excellent weldability in resistance welding, and moreover does not peel off at the clad boundary at the time of bending work.

BRIEF DESCRIPTION OF THE DRAWING(S)

Figure 1:
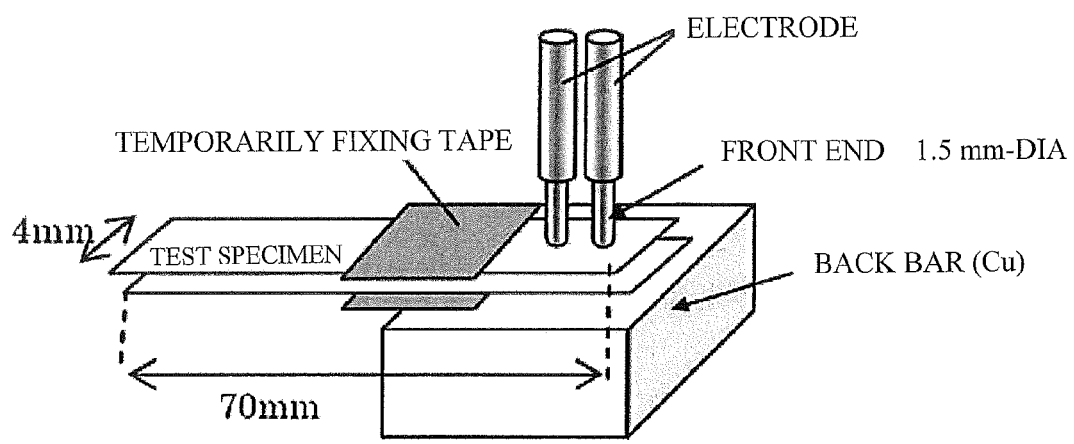
FIG. 1 is a schematic view of a testing device used for a spot welding test.
Figure 2:
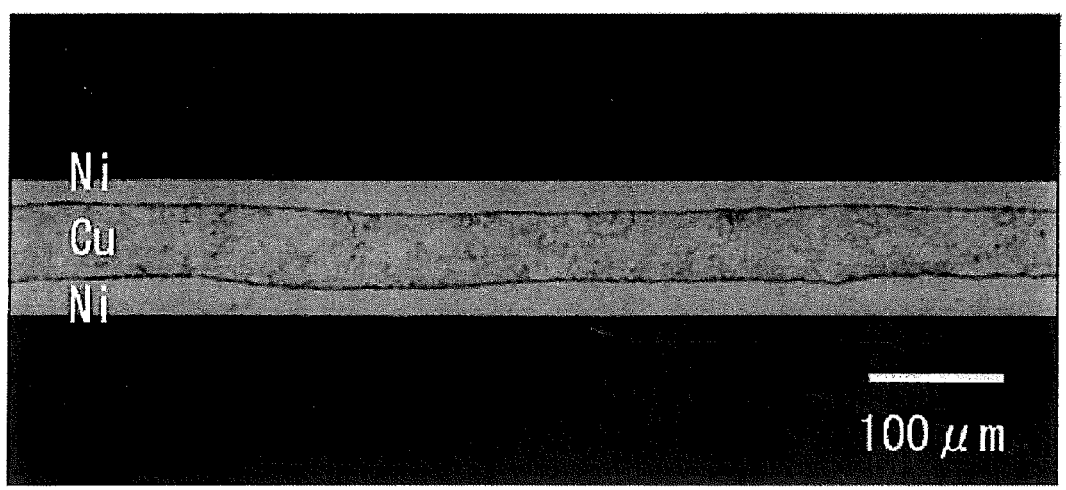
FIG. 2 is a microphotograph of a good clad material.
Figure 3:
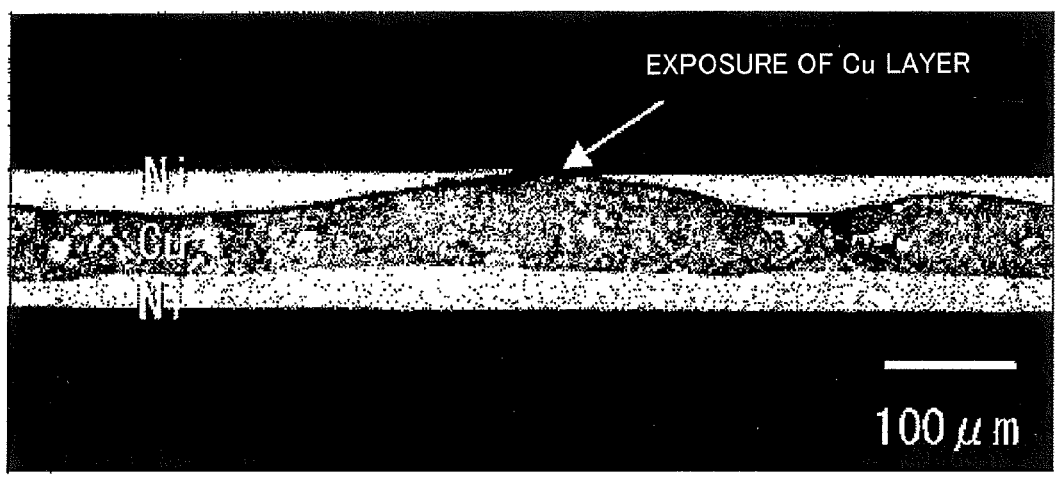
FIG. 3 is a microphotograph of a clad material in which variations in outer layer thickness are large.
Figure 4:
FIG. 4 is a microphotograph of a cross section of a clad material.
Figure 5:
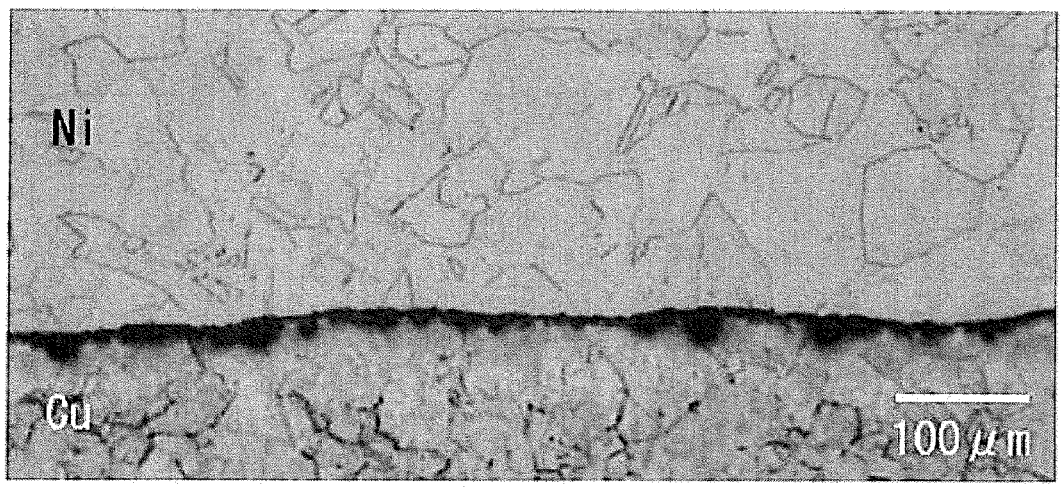
FIG. 5 is a microphotograph taken after the clad material shown in FIG. 4 has been subjected to predetermined etching.

MODE FOR CARRYING OUT THE INVENTION (1) Clad Material

The clad material of the present invention includes outer layers each consisting of Ni or Ni alloy and a base layer consisting of Cu or Cu alloy. In this clad material, as the outer layer, Ni or Ni alloy that is excellent in resistance weldability and corrosion resistance against electrolytic solution is used, and as the base layer, Cu or Cu alloy that has low electrical resistance is used.

As the Ni alloy, to attain higher corrosion resistance, an alloy containing about 3 mass % of Cr can be used. To attain still higher corrosion resistance, for example, an alloy conforming to JIS NW4400 consisting, by mass percent, of 66% of Ni, 1% of Mn, 1% of Fe, the balance being Cu and impurities, can be used. As the Cu alloy, an alloy containing 10 mass % of Ni (cupronickel), a Cu—Zr alloy attaining high heat resistance, high strength, and high electric conductivity by the addition of 0.1 mass % of Zr, an alloy attaining high strength and high electric conductivity by the addition of P, Cr, Ti, Fe and the like, and the like alloys can be used.

The clad material of the present invention has a feature such that peeling-off at a clad boundary is not recognized in cross section observation made after the clad material has been subjected to a 90° reverse bend test ten times, and the number of reverse bend cycles before rupture is 17 cycles or more. The lead material for secondary battery, to which the material of the present invention is applied, is joined to the bottom portion of a battery tube by spot resistance welding in a state of being bent through about 90 degrees. In the state in which the clad material boundary peels off, the resistance increases locally, and stable spot welding is difficult to perform. For this reason, it is essential that the clad material be not peeled off at the clad boundary by 90° bending.

Also, in the clad material used as the lead material, a high electric current is caused to flow, and the clad material is sometimes used in an environment in which the clad material is subject to vibrations, for example, when the clad material is used for hybrid vehicles or power tools. In such a service environment, a portion that is spot welded after bending work, especially, a bent portion is subject to repeated stresses caused by vibrations.

In order for the clad material to be used by being bent or not to peel off even being subject to repeated stress loads caused by vibrations, it is necessary that the clad material do not peel off even if being subjected to a bend test (using the later-described method described in Example) ten times. Also, in order for the clad material not to rupture in the environment in which the clad material is subject to repeated stresses caused by heavy vibrations, for example, when the clad material is used for power tools, it is necessary that the number of reverse bend cycles before rupture by 90° bend test be 17 cycles or more. This testing method is suitable for the evaluation of joint strength of a foil product having a thickness of 0.2 mm or smaller.

If the thickness of clad material exceeds 0.2 mm, the rigidity of the lead material itself increases, and the clad material is less liable to be affected by the repeated stress loads caused by vibrations. Also, the increase in thickness increases the stresses given to the joint boundary when the bend test is conducted. Therefore, the joint strength can be evaluated by one-time 90° bend test. In this case, the joint strength is evaluated by visual observation (or further optical microscope observation) made after one-time 90° bend test. At this time, the bend radius is made two times the clad material thickness. Further, if bend-and-return is accomplished after the 90° bend test, a still higher shearing stress can be given to the joint boundary. Therefore, it can be said that the clad material in which peeling-off is not observed even after bend-and-return has a still higher joint strength.

The peel strength of Ni—Cu is preferably 4 N/mm or higher. This is because if the peel strength of Ni—Cu is lower than 4 N/mm, there arises a problem that peeling-off at the boundary occurs when bending work is performed or when slitting work is performed at a stage before the bending work. The peel strength is preferably 6 N/mm or higher, further preferably 10 N/mm or higher.

The above-described "peel strength" is a strength at the time when the layers are peeled off from each other by cutting a notch between the Cu/Ni layers, by pulling the layers to the opposite direction while the end portions of the layers are grasped. This test (T-type peeling test) is especially suitable for the evaluation of a relatively thick product having a thickness exceeding 1 mm. For a thin product having a thickness of 1 mm or smaller, since a notch cannot be cut between the Cu/Ni layers, the joint strength should be evaluated by the above-described bend test.

For the clad material of the present invention, the porosity of vacancies that are present at the joint boundary of clad material is preferably 20% or less.

By being subjected to predetermined etching treatment, the oxides and/or voids that are present at the joint boundary of clad material can be observed as vacancies. It is presumed that the vacancies at the boundary are observed mainly on the Cu side, the oxides that are present at the joint boundary is melted by etching, or a portion around the void is etched, whereby the vacancies become liable to be observed. Therefore, in the present invention, the joint boundary is observed after the predetermined etching treatment has been performed, and the ratio of the distance in which the vacancies are present to the reference length of joint boundary (in this description, this ratio is referred to as "porosity") is made an index for grasping the formation situation of oxides. The vacancy distance existing at the joint boundary can specifically be determined in accordance with the method described in Example.

If the porosity exceeds 20%, the amount of oxides and/or voids that are present at the joint boundary of clad material is too large, so that the area fraction of an adhesion layer of Ni—Cu decreases, and the joint strength decreases. Also, when the clad material in which oxides and/or voids are present partially at the joint boundary is subjected to rolling or the like working, the outer layer is liable to be extended and thinned at the boundary at which oxides and/or voids are present as compared with the boundary at which metals are joined to each other. Therefore, the porosity is preferably made 20% or less. In the application such as a lead material for secondary battery, the clad material is often subjected to the above-described 90° bending work, and if vacancies are present in the bend portion, the vacancies are liable to become starting points of boundary peeling. For this reason, the porosity is preferably made 20% or less. A further preferable range is 10% or less, and a still further preferable range is 2% or less.

For the clad material of the present invention, the coefficient of variation in outer layer thickness is preferably 5 or less. This is because, for the clad material in which the coefficient of variation in outer layer thickness is 5 or less, the weldability in spot resistance welding to an Ni plate assuming a battery can be excellent. The coefficient of variation in outer layer thickness is further preferably made 4 or less. The coefficient of variation in outer layer thickness can be determined in accordance with the method described in Example.

The clad material of the present invention is usually used by being cut into strips, so that on the cut surface, Cu is exposed. For a square battery, the lead material is used within the battery. On the other hand, for a laminate battery, the lead material itself must be connected to external wiring, so that the cut surface of lead material is expose to the laminate seal outside, and is subject to corrosion caused by the atmosphere (moisture, oxygen, carbon dioxide). When corrosion advances into the laminate seal of lead material, solution leakage and the like sometimes occur.

Therefore, it is preferable that a Ni layer be formed on the cut surface of the clad material of the present invention. This is because the formation of Ni layer can prevent the above-described corrosion. However, even if the Ni layer is formed excessively, the effect saturates, and the cost increases. Therefore, the thickness of Ni layer formed on the cut surface of the clad material of the present invention should be made 10 μm or smaller. The above-described effect becomes remarkable when the thickness is 0.1 μm or larger. The method for forming the Ni layer is not subject to any special restriction, and the electrolytic plating method, the vapor deposition method, and the like may be adopted. The electrolytic plating method is especially suitable because of its easiness and low cost.

(2) Method for Producing Clad Material

The clad material of the present invention can be produced, for example, by laminatedly combining the outer layers with the base layer, by performing joint rolling to bring the boundary surfaces into close contact with each other, and by performing heat treatment for diffusing and eliminating oxides (hereinafter, referred to as "diffusion annealing").

Even if diffusion annealing is performed without performing the above-described working, in the case where a portion in which Ni and Cu are not in close contact with each other is present, the oxides cannot sometimes be eliminated sufficiently. Also, the diffusion joint of metals (in the case where the materials to be joined are copper and nickel, nickel elements diffuse in copper, and also copper elements diffuse in nickel) is not produced in a portion in which the metals are not in close contact with each other. Therefore, if such a material is heat-rolled subsequently, the joint strength becomes insufficient, and peeling-off may occur in some cases.

In order to diffuse and eliminate oxides, it is necessary to make, in advance, the boundary surfaces in a closely contacting state. For this purpose, the joint rolling should be performed at rolling temperature T(° C.) and draft R(%) in the range satisfying Formula (1). The rolling temperature is a temperature at the rolling time, and is usually equivalent to the heating temperature.

$$T \geq -10 \cdot R + 300 \quad (1)$$

If the rolling temperature is lower than [−10·R+300], even if diffusion annealing is performed, the joint strength is insufficient, and peeling-off is liable to occur on account of subsequent hot rolling or cold rolling. Also, the thickness of clad material is regulated to a target thickness by repeating cold rolling and annealing after hot rolling. At this time, concerning the annealing, continuous annealing is often performed from the viewpoint of cost and productivity, so that the heat treatment time is short. Therefore, in such continuous annealing, the effect of diffusion joint is less liable to be achieved, and the joint strength of hot-rolled plate takes a value close to that of the joint strength of product. Therefore, for the clad material used in applications requiring higher close contact strength, the joint rolling should be performed at rolling temperature T(° C.) and draft R(%) in the range satisfying Formula (2).

$$T \geq -17.8 \cdot R + 1084 \quad (2)$$

The diffusion annealing has only to be performed under conditions that oxides diffuse and disappear. In particular, it is preferable that the material be held in a temperature range of not lower than 650° C. to not higher than 975° C. for a time period of not shorter than 10 minutes and not longer than 8 hours. The diffusion annealing performed under these conditions not only performs mutual diffusion of metals but also has an action for strengthening the metal joint. This is because the mutual diffusion of metals occurs from a portion in which oxides diffuse and disappear, and the metal joint is strengthened. Also, it is necessary that sufficient diffusing and eliminating treatment be performed under the above-described conditions so that the oxygen produced by the decomposition of oxides does not concentrate at a specific portion (in the Cu layer near the clad boundary) at high concentrations. In particular, it is preferable that annealing be performed under conditions that the joint portion is held in a temperature range of not lower than 750° C. to not higher than 850° C. for a time period of not shorter than 1 hour and not longer than 4 hours.

If the annealing temperature is high, a large difference occurs between Ni diffusion rate into Cu and Cu diffusion rate into Ni, and voids are produced at the boundary by the Kirkendall effect. The voids become more remarkable when the material is held for a long period of time even at the same temperature. If the voids are produced, even if subsequent hot working is performed, unpressed voids remain, and the joint strength sometimes decreases. Therefore, it is of importance to restrain the production of voids on account of the Kirkendall effect in the above-described heat treatment condition range.

After diffusion annealing, hot rolling is preferably performed. By this hot rolling, the plate thickness can be decreased easily, and at the same time, further strong metal joint can be attained at almost the whole boundary surface of metal.

Thus, after a strong metal joint boundary surface has been produced once, a predetermined thickness should be attained by performing cold rolling and annealing at least one time. In the case where cold rolling is difficult to perform, warm rolling and/or hot rolling may be performed.

The heating in the case where hot rolling is performed is preferably performed combined with diffusion annealing. Also, the heating temperature and time, must be set considering the conditions of diffusion annealing so that the voids are less liable to be produced by the Kirkendall effect. On the other hand, if rolling is performed at a too low temperature, the difference in deformation resistance between Ni and Cu increases, and the evenness of outer layer thickness may be impaired. Therefore, hot rolling is preferably performed in the heating temperature range of 650 to 900° C. The preferable lower limit of hot rolling temperature is 800° C., and the preferable upper limit thereof is 850° C.

EMBODIMENT(S)

Example 1

A plate (120 mm×100 mm×20 mm) consisting of oxygen-free pure Cu (C1020) and plates (120 mm×100 mm×12 mm) each consisting of pure Ni (JIS NW2201) were prepared. The joint surfaces of these plates were ground with a stainless steel wire, and were subjected to degreasing treatment. Thereafter, in the order of the pure Ni plate, the pure Cu plate, and the pure Ni plate, the surfaces of 120 mm×100 mm were lapped and laminated. These plates were joined by electron beam welding in the state in which the plates were fixed with clamps so that the portion to be joined did not shift horizontally, whereby a laminated roll base metal was prepared. The laminated roll base metal thus obtained was subjected to various kinds of working and treatment given in Table 1, whereby specimens were obtained. On the obtained specimens, the tests described below were conducted to evaluate various performances. The test results are given in Table 2. The diffusion annealing was performed combined with the heating for hot rolling.

<Reverse Bend Test>

Figure 6:
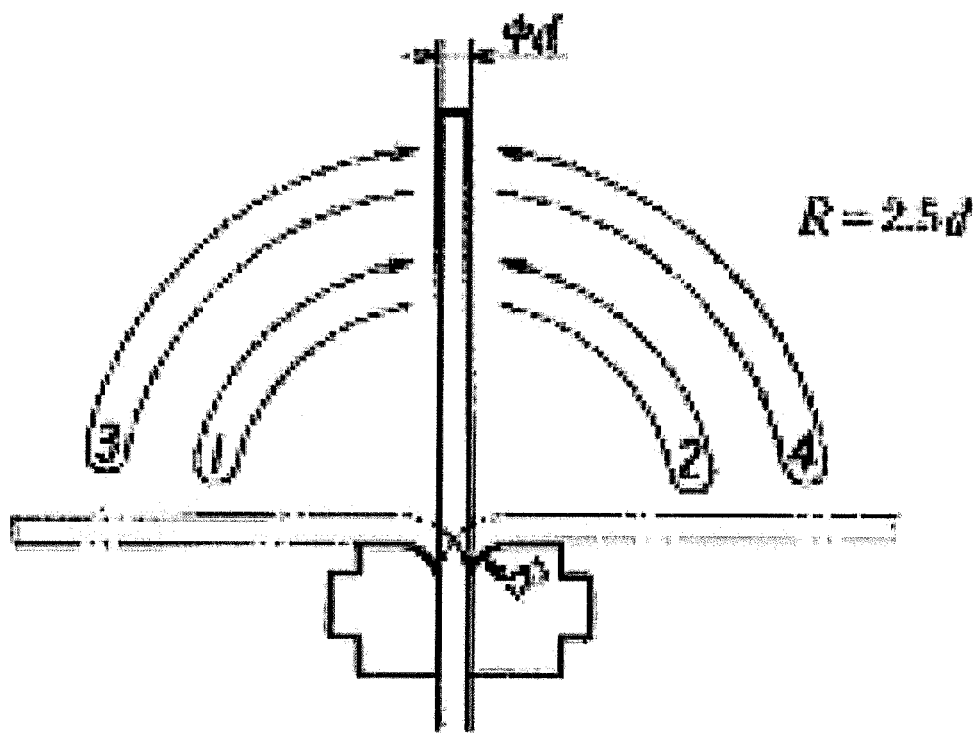
FIG. 6 is a schematic view of a device for a reverse bend test.

A reverse bend test was conducted conforming to JIS H0500 (Reverse bend test) specified for copper and copper-base alloy product. Specifically, a material to be tested (100 μm thick×3 mm wide×70 mm long) was fixed with a pair of grips each having a circular arc of R=2.5 d (diameter of material to be tested), and the reverse bend test was conducted while pulling (pulling force: 150 g) the other end of the material to be tested so that the material is not deflected. In this reverse bend test, the material to be tested was bent repeatedly and alternately in the normal and reverse directions through 90 degrees along the circular arc, as shown in FIG. 6.

The test was conducted ten times by counting 90° bend-and-return as one time. The material to be tested subjected to the test was embedded in a resin for metal micro-structure observation, and was ground to observe the presence of peel at the clad boundary. Also, in addition to the above-described test, the number of reverse bend cycles before rupture was examined. The average value of the number of cycles of five materials to be tested was defined as "the number of reverse bend cycles before rupture".

<Porosity of Vacancies Present at Joint Boundary>

The clad material was cut to a suitable length, being embedded in a resin in an orientation in which the cross section of the joint boundary can be observed, and was ground. Thereafter, etching was performed with nital (nitric acid:ethanol=4:1) until the micro-structures of outer layer and base layer come to be able to be observed, and by using an optical microscope, a portion corresponding to a length of 100 mm of joint boundary was observed in the whole field of view at a magnification of 100×. The percentage (L1/L× 100%) of a length L1 in which vacancies are present with respect to a reference length L (100 mm) is defined as "porosity".

<Coefficient of Variation in Outer Layer Thickness>

On the cross section of clad material, a portion within 100 mm of joint boundary was observed in 15 fields of view, the mean value and standard deviation of thicknesses were calculated, and the coefficient of variation in outer layer thickness (=standard deviation/mean value×100) was calculated. The coefficient of variation in outer layer thickness of 5 or less is regarded as good.

<Electric Conductivity>

Conforming to JIS C2525:1999 (Testing method for conductor-resistance and volume resistivity of metallic resistance materials), the clad material was worked into a lead shape (100 μm thick×10 mm wide×500 mm long) equivalent to that of the battery lead material, the cross-sectional areas of five points were measured, and the volume resistivity at room temperature (23° C.) was measured from the average cross-sectional area. Also, electric conductivity (=1/volume resistivity ρ) was determined from the volume resistivity.

The measurement was made by using a dc voltage current source TR6143 manufactured by Advantest and a digital multimeter HP3457 manufactured by Agilent Technologies. Specifically, in accordance with the connection shown in Reference FIG. 1.1 in JIS C2525, a voltage drop amount (ΔV) at the time when a constant current (I=1.0A) was caused to flow was measured (by the four-terminal method) using a voltmeter connected to between the current terminals. Based on the measurement result, the volume resistivity ρ was calculated by using the following formula00.

$$\rho = (\Delta V/I)/L \times S \, \Omega \cdot m$$

in which the meanings of the symbols in the above formula are as follows:
I: current (A)
S: cross-sectional area ($m^2$)
L: distance between voltage measurement terminals (m)

According to the "Chronological Scientific Tables", at 20° C., the volume resistivity of pure nickel is $7.12 \times 10^{-8}$ Ω·m, and the volume resistivity of pure copper is $1.69 \times 10^{-8}$ Ω·m. Therefore, for example, for a clad plate of pure nickel—pure copper—pure nickel having a thickness ratio of Ni:Cu:Ni=12:20:12, theoretically, the volume resistivity at 20° C. is $2.89 \times 10^{-8}$ Ω·m. The theoretical value of electric conductivity, which is the reciprocal number of volume resistivity, is 34.5 ($\times 10^6$ $m^{-1} \cdot \Omega^{-1}$). The case where the attenuation with respect to the theoretical value is within 10% (that is, the case of 31.1 ($\times 10^6$ $m^{-1} \cdot \Omega^{-1}$) or higher) is regarded as good.

<Spot Welding Test>

Using an experimental device shown in FIG. 1, two rectangular slab shaped test specimens (each measuring 0.1 mm×4 mm×70 mm, the back bar side is Ni) were lapped on each other, and the front edge portions thereof were welded by series welding method (upslope time=0.5 msec, welding time=4 msec), whereby five welding test specimens were prepared.

In the weld spot portion of the obtained welding test specimen, the weldability was examined by a T-type peeling test. The maximum value (=maximum peel strength) of the peel strengths obtained by the peeling test was evaluated. Further, the peel mode was defined by observing the test specimen after peeling-off. Also, the welding stability was evaluated from the variations in joint strengths of the five welding test specimens. When, for all of the five test specimens, the variations were within ±30% of the average joint strength, the welding stability was judged to be good, and was represented by "○" in Table 2. When, for one or more of the five test specimens, the joint strength exceeded ±30% of the average joint strength, the welding stability was judged to be poor, and was represented by "x" in Table 2.

TABLE 1

| Classification | | Working | | | Hot rolling | | | Subsequent rolling work | Final plate thickness |
|---|---|---|---|---|---|---|---|---|---|
| | | Heating conditions | | Working ratio (%) | Heating conditions | | Working ratio (%) | | |
| | | Temperature (° C.) | Time (Hr) | | Temperature (° C.) | Time (Hr) | | | |
| Example embodiment of the present invention | 1 | 350 | 2 | 35 | 975 | 1 | 65 | Cold rolling → annealing(750° C.) → cold rolling → annealing(750° C.) → cold rolling → annealing(750° C.) | 0.1 mm |
| | 2 | 550 | 1 | 25 | 800 | 2 | 60 | Cold rolling → annealing(750° C.) → cold rolling → annealing(750° C.) → cold rolling → annealing(750° C.) | 0.1 mm |
| | 3 | 550 | 1 | 50 | 950 | 4 | 50 | Cold rolling → annealing(750° C.) → cold rolling → annealing(750° C.) → cold rolling → annealing(750° C.) | 0.1 mm |
| | 4 | 550 | 2 | 50 | 750 | 8 | 35 | Cold rolling → annealing(750° C.) → cold rolling → annealing(750° C.) → cold rolling → annealing(750° C.) | 0.1 mm |
| | 5 | 650 | 1 | 20 | 750 | 2 | 65 | Cold rolling → annealing(750° C.) → cold rolling → annealing(750° C.) → cold rolling → annealing(750° C.) | 0.1 mm |
| | 6 | 650 | 1 | 45 | 950 | 4 | 60 | Cold rolling → annealing(750° C.) → cold rolling → annealing(750° C.) → cold rolling → annealing(750° C.) | 0.1 mm |
| | 7 | 650 | 2 | 50 | 850 | 5 | 50 | Cold rolling → annealing(750° C.) → cold rolling → annealing(750° C.) → cold rolling → annealing(750° C.) | 0.1 mm |
| | 8 | 750 | 1 | 50 | 950 | 2.5 | 40 | Cold rolling → annealing(750° C.) → cold rolling → annealing(750° C.) → cold rolling → annealing(750° C.) | 0.1 mm |
| | 9 | 750 | 2 | 50 | 800 | 6.5 | 40 | Cold rolling → annealing(750° C.) → cold rolling → annealing(750° C.) → cold rolling → annealing(750° C.) | 0.1 mm |
| | 10 | 850 | 1 | 25 | 750 | 2 | 65 | Cold rolling → annealing(750° C.) → cold rolling → annealing(750° C.) → cold rolling → annealing(750° C.) | 0.1 mm |
| | 11 | 950 | 1 | 45 | 975 | 0.25 | 50 | Cold rolling → annealing(750° C.) → cold rolling → annealing(750° C.) → cold rolling → annealing(750° C.) | 0.1 mm |
| Comparative example | 1 | Normal temperature | | 15 | 550 | 3 | 65 | Cold rolling → annealing(750° C.) → cold rolling → annealing(750° C.) → cold rolling → annealing(750° C.) | 0.1 mm |
| | 2 | 550 | 0.5 | 70 | — | — | — | Cold rolling → annealing(750° C.) → cold rolling → annealing(750° C.) → cold rolling → annealing(750° C.) | 0.1 mm |
| | 3 | 550 | 1 | 15 | 950 | 15 | 65 | Cold rolling → annealing(750° C.) → cold rolling → annealing(750° C.) → cold rolling → annealing(750° C.) | 0.1 mm |
| | 4 | 950 | 1 | 15 | 950 | 15 | 65 | Cold rolling → annealing(750° C.) → cold rolling → annealing(750° C.) → cold rolling → annealing(750° C.) | 0.1 mm |

TABLE 2

| Classification | | Joint property evaluation | | | | Spot resistance weldability | | |
|---|---|---|---|---|---|---|---|---|
| | | Boundary peeling-off in 10-times bend test | Number of bend cycles before rupture (cycles) | Porosity | Coefficient of variation in outer layer thickness | Electric conductivity (×10$^6$ m/Ω) | Average joint strength (N) | Welding stability | Peel mode |
| Example embodiment of the present invention | 1 | Not peeled off at boundary | 23.2 | 17.3% | 4.6 | 32.3 | 11.4 | ○ | Base metal |
| | 2 | Not peeled off at boundary | 27.4 | 0.8% | 2.3 | 35.6 | 18.2 | ○ | Base metal |
| | 3 | Not peeled off at boundary | 21.2 | 18.9% | 4.3 | 32.6 | 10.9 | ○ | Base metal |
| | 4 | Not peeled off at boundary | 22.4 | 16.4% | 3.7 | 32.5 | 13.2 | ○ | Base metal |
| | 5 | Not peeled off at boundary | 26.2 | 1.6% | 3.1 | 34.3 | 17.8 | ○ | Base metal |
| | 6 | Not peeled off at boundary | 20.6 | 19.3% | 4.4 | 32.4 | 10.3 | ○ | Base metal |
| | 7 | Not peeled off at boundary | 25.6 | 13.1% | 4.2 | 33.9 | 15.9 | ○ | Base metal |
| | 8 | Not peeled off at boundary | 22.8 | 17.8% | 3.9 | 32.9 | 10.4 | ○ | Base metal |
| | 9 | Not peeled off at boundary | 24.4 | 8.8% | 3.8 | 33.6 | 17.2 | ○ | Base metal |
| | 10 | Not peeled off at boundary | 26.2 | 1.3% | 2.9 | 34.7 | 18.3 | ○ | Base metal |
| | 11 | Not peeled off at boundary | 24.8 | 4.7% | 4.1 | 33.3 | 16.2 | ○ | Base metal |
| Comparative example | 1 | Peeled off at boundary between outer layer and base layer | 18.2 | 3.1% | 6.6 | 33.4 | 9.1 | x | Boundary |
| | 2 | Peeled off at boundary between outer layer and base layer | 15.4 | 1.2% | 12.7 | 29.1 | 3.2 | x | Boundary |
| | 3 | Peeled off at boundary between outer layer and base layer | 15.8 | 36.3% | 7.3 | 27.2 | 7.1 | x | Boundary |
| | 4 | Peeled off at boundary between outer layer and base layer | 14.2 | 42.1% | 9.3 | 26.5 | 5.8 | x | Boundary |

Figure 7:
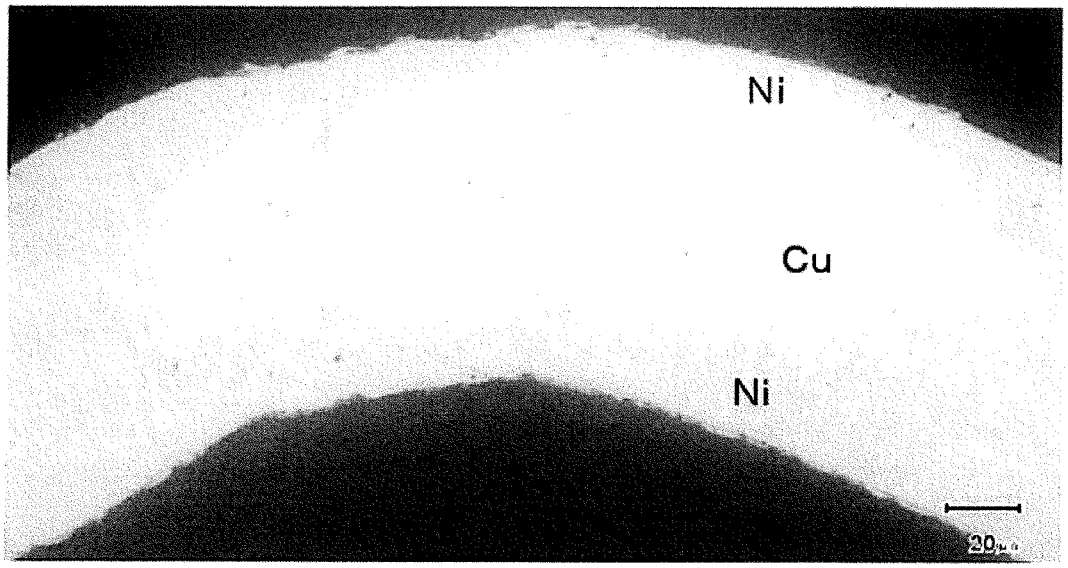
FIG. 7 is a microphotograph showing a cross section after ten-times reverse bend test of example embodiment of the present invention 2.
Figure 8:
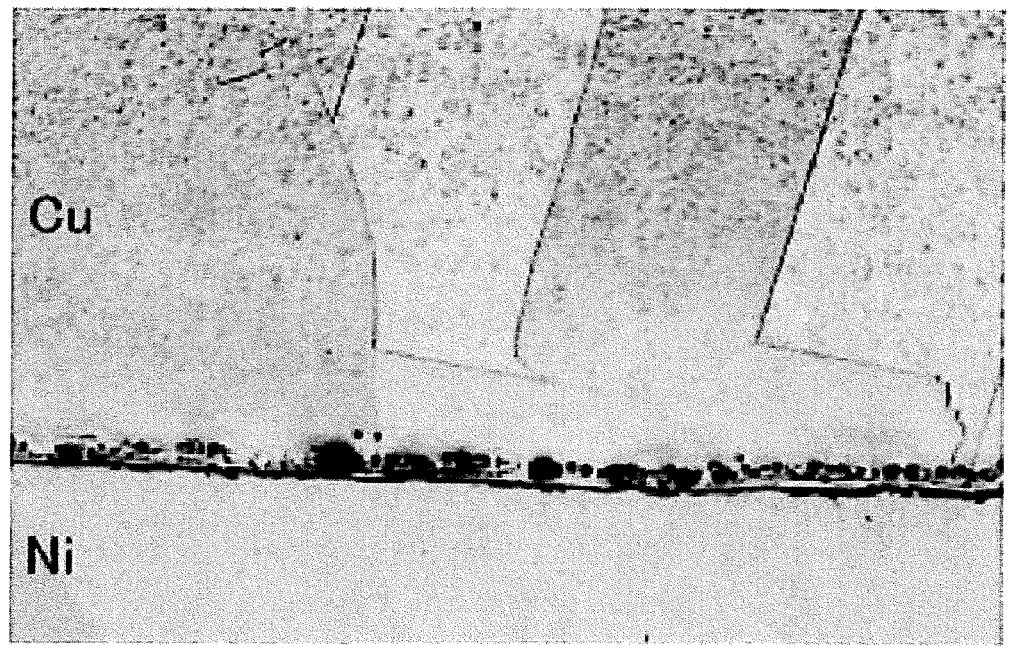
FIG. 8 is a microphotograph showing a cross section of a clad material subjected to diffusion heat treatment at 950° C.

As shown in Table 2 and FIG. 7, concerning the joint property, in example embodiments of the present invention, since the porosity was 20% or less, peeling-off at a clad boundary was not recognized in the case where ten-times reverse bend test was conducted, and the number of reverse bend cycles before rupture was 18 cycles or more. In particular, in example embodiment of the present invention of 2 having a porosity of 1% or less, the number of reverse bend cycles before rupture was 20 cycles or more, so that the joint property was especially excellent. On the other hand, in comparative examples 1 and 2, although the porosity was low, the welding stability was poor. The reason for this is that a portion in which the joint was incomplete was present because, in comparative example 1, the joint rolling temperature was normal temperature, and in comparative example 2, the joint annealing was not performed. In comparative examples 3 and 4, the porosity exceeded 20%, Kirkendall voids were produced, and the number of bend cycles before rupture was as low as less than 16 cycles.

Concerning the coefficient of variation in outer layer thickness, in example embodiments of the present invention, the coefficient of variation in outer layer thickness was 5 or lower, the spot welding stability was excellent, and a high strength such that the average joint strength was higher than 10N was attained. On the other hand, in comparative examples, the coefficient of variation exceeded 5, and the joint strength was as low as less than 10N.

Example 2

The laminated roll base metal obtained by the same method as that of Example 1 was subjected to various kinds of working and diffusion heat treatment as given in Table 3, whereby specimens were obtained. In any of these examples, hot rolling was performed continuously immediately after diffusion annealing. For the obtained specimens, the reverse bend test, the calculation of porosity, coefficient of variation in outer layer thickness, and electric conductivity, and the spot welding test were carried out by the same methods as those of Example 1, and also the joint strength after diffusion heat treatment was examined by the method described below. The results are given in Table 4.

<Joint Strength Test>

A joint strength test was conducted conforming to JIS K6849 (Testing methods for tensile strength of adhesive bonds) and using AUTOGRAPH AG-20kNG manufactured by Shimadzu. Specifically, a tensile test specimen measuring 20 mm thick×10 mm wide×3 mm length was sampled from a starting material having been subjected to diffusion heat treatment, and was fixed with jigs so that the load direction is perpendicular to the joint boundary. Subsequently, a tensile test was conducted at a cross-head speed of 2.7 mm/min, and the maximum strength before rupture was measured. Based on this measurement result, joint strength S was calculated by using the following formula, and the calculation result was rounded to an integer.

$$S = P/A \text{ N/mm}^2$$

in which the meanings of the symbols in the above formula are as follows:

P: maximum load (N)

A: Cross-sectional area of test specimen (mm$^2$)

TABLE 3

| Method No. | Working Heating conditions Temperature (°C.) | Time (Hr) | Working ratio (%) | Diffusion annealing Temperature (°C.) | Time (Hr) | Hot rolling ratio (%) | Subsequent rolling work | Final plate thickness | Remarks |
|---|---|---|---|---|---|---|---|---|---|
| 1 | 850 | 1 | 40 | 700 | 2 | 90 | Cold rolling → annealing(800° C.) → cold rolling → annealing(800° C.) → cold rolling → annealing(800° C.) | 0.1 mm | Example embodiment of the present invention |
| 2 | 850 | 1 | 40 | 750 | 2 | 90 | Cold rolling → annealing(800° C.) → cold rolling → annealing(800° C.) → cold rolling → annealing(800° C.) | 0.1 mm | Example embodiment of the present invention |
| 3 | 850 | 1 | 40 | 800 | 2 | 90 | Cold rolling → annealing(800° C.) → cold rolling → annealing(800° C.) → cold rolling → annealing(800° C.) | 0.1 mm | Example embodiment of the present invention |
| 4 | 850 | 1 | 40 | 850 | 2 | 90 | Cold rolling → annealing(800° C.) → cold rolling → annealing(800° C.) → cold rolling → annealing(800° C.) | 0.1 mm | Example embodiment of the present invention |
| 5 | 850 | 1 | 40 | 900 | 2 | 90 | Cold rolling → annealing(800° C.) → cold rolling → annealing(800° C.) → cold rolling → annealing(800° C.) | 0.1 mm | Example embodiment of the present invention |
| 6 | 850 | 1 | 40 | 950 | 2 | 90 | Cold rolling → annealing(800° C.) → cold rolling → annealing(800° C.) → cold rolling → annealing(800° C.) | 0.1 mm | Example embodiment of the present invention |
| 7 | 850 | 1 | 40 | 980 | 2 | 90 | Cold rolling → annealing(800° C.) → cold rolling → annealing(800° C.) → cold rolling → annealing(800° C.) | 0.1 mm | Comparative example |
| 8 | 850 | 1 | 40 | 750 | 0.5 | 90 | Cold rolling → annealing(800° C.) → cold rolling → annealing(800° C.) → cold rolling → annealing(800° C.) | 0.1 mm | Example embodiment of the present invention |
| 9 | 850 | 1 | 40 | 750 | 1 | 90 | Cold rolling → annealing(800° C.) → cold rolling → annealing(800° C.) → cold rolling → annealing(800° C.) | 0.1 mm | Example embodiment of the present invention |
| 10 | 850 | 1 | 40 | 750 | 3 | 90 | Cold rolling → annealing(800° C.) → cold rolling → annealing(800° C.) → cold rolling → annealing(800° C.) | 0.1 mm | Example embodiment of the present invention |
| 11 | 850 | 1 | 40 | 750 | 4 | 90 | Cold rolling → annealing(800° C.) → cold rolling → annealing(800° C.) → cold rolling → annealing(800° C.) | 0.1 mm | Example embodiment of the present invention |
| 12 | 850 | 1 | 40 | 750 | 6 | 90 | Cold rolling → annealing(800° C.) → cold rolling → annealing(800° C.) → cold rolling → annealing(800° C.) | 0.1 mm | Example embodiment of the present invention |
| 13 | 850 | 1 | 40 | 750 | 8 | 90 | Cold rolling → annealing(800° C.) → cold rolling → annealing(800° C.) → cold rolling → annealing(800° C.) | 0.1 mm | Example embodiment of the present invention |
| 14 | 850 | 1 | 40 | 750 | 10 | 90 | Cold rolling → annealing(800° C.) → cold rolling → annealing(800° C.) → cold rolling → annealing(800° C.) | 0.1 mm | Comparative example |
| 15 | 850 | 1 | 40 | 800 | 3 | 90 | Cold rolling → annealing(800° C.) → cold rolling → annealing(800° C.) → cold rolling → annealing(800° C.) | 0.1 mm | Example embodiment of the present invention |

TABLE 3-continued

| | Working | | | | | | | | |
|---|---|---|---|---|---|---|---|---|---|
| | Heating conditions | | Working | Diffusion annealing | | Hot rolling | | Final | |
| Method No. | Temperature (° C.) | Time (Hr) | ratio (%) | Temperature (° C.) | Time (Hr) | ratio (%) | Subsequent rolling work | plate thickness | Remarks |
| 16 | 850 | 1 | 40 | 800 | 4 | 90 | Cold rolling → annealing(800° C.) → cold rolling → annealing(800° C.) → cold rolling → annealing(800° C.) | 0.1 mm | Example embodiment of the present invention |
| 17 | 850 | 1 | 40 | 850 | 3 | 90 | Cold rolling → annealing(800° C.) → cold rolling → annealing(800° C.) → cold rolling → annealing(800° C.) | 0.1 mm | Example embodiment of the present invention |
| 18 | 850 | 1 | 40 | 900 | 3 | 90 | Cold rolling → annealing(800° C.) → cold rolling → annealing(800° C.) → cold rolling → annealing(800° C.) | 0.1 mm | Example embodiment of the present invention |
| 19 | 850 | 1 | 40 | 950 | 1 | 90 | Cold rolling → annealing(800° C.) → cold rolling → annealing(800° C.) → cold rolling → annealing(800° C.) | 0.1 mm | Example embodiment of the present invention |

TABLE 4

| | | | Joint property evaluation | | | | | Spot resistance weldability | | |
|---|---|---|---|---|---|---|---|---|---|---|
| Classification | Method No. | Joint strength (N/mm$^2$) | Boundary peeling-off in 10-times bend test | Number of bend cycles before rupture (cycles) | Porosity | Coefficient of variation in outer layer thickness | Electric conductivity (×10$^6$ m/Ω) | Average joint strength (N) | Welding stability | Peel mode |
| Example embodiment of the present invention | 12 | 1 | 153 | Not peeled off at boundary | 20.1 | 0.6% | 4.2 | 33.6 | 16.9 | ○ | Base metal |
| | 13 | 2 | 190 | Not peeled off at boundary | 27.8 | 1.2% | 3.7 | 35.3 | 18.9 | ○ | Base metal |
| | 14 | 3 | 188 | Not peeled off at boundary | 26.9 | 1.8% | 3.9 | 34.1 | 18.1 | ○ | Base metal |
| | 15 | 4 | 147 | Not peeled off at boundary | 24.3 | 5.6% | 3.8 | 34.6 | 16.8 | ○ | Base metal |
| | 16 | 5 | 100 | Not peeled off at boundary | 24.1 | 9.7% | 3.9 | 33.3 | 13.2 | ○ | Base metal |
| | 17 | 6 | 64 | Not peeled off at boundary | 20.6 | 17.4% | 3.9 | 32.6 | 11.2 | ○ | Base metal |
| | 18 | 8 | 108 | Not peeled off at boundary | 22.3 | 0.3% | 3.6 | 35.2 | 13.1 | ○ | Base metal |
| | 19 | 9 | 148 | Not peeled off at boundary | 23.6 | 0.7% | 3.7 | 35.1 | 15.2 | ○ | Base metal |
| | 20 | 10 | 181 | Not peeled off at boundary | 26.4 | 1.7% | 3.7 | 34.8 | 19.1 | ○ | Base metal |
| | 21 | 11 | 163 | Not peeled off at boundary | 25.6 | 3.4% | 3.9 | 33.9 | 17.1 | ○ | Base metal |
| | 22 | 12 | 117 | Not peeled off at boundary | 23.4 | 8.8% | 3.8 | 32.8 | 15.7 | ○ | Base metal |
| | 23 | 13 | 52 | Not peeled off at boundary | 21.1 | 19.5% | 4.1 | 32.4 | 10.4 | ○ | Base metal |
| | 24 | 15 | 151 | Not peeled off at boundary | 24.6 | 2.3% | 3.7 | 34.1 | 16.5 | ○ | Base metal |
| | 25 | 16 | 130 | Not peeled off at boundary | 23.4 | 3.6% | 3.6 | 33.7 | 16.4 | ○ | Base metal |
| | 26 | 17 | 118 | Not peeled off at boundary | 21.9 | 4.2% | 3.9 | 33.2 | 14.2 | ○ | Base metal |
| | 27 | 18 | 88 | Not peeled off at boundary | 19.2 | 13.4% | 4.1 | 32.9 | 12.6 | ○ | Base metal |
| | 28 | 19 | 75 | Not peeled off at boundary | 18.8 | 15.5% | 4.2 | 32.8 | 12.2 | ○ | Base metal |

TABLE 4-continued

| | | | | Joint property evaluation | | | | Spot resistance weldability | | |
|---|---|---|---|---|---|---|---|---|---|---|
| Classification | Method No. | Joint strength (N/mm²) | Boundary peeling-off in 10-times bend test | Number of bend cycles before rupture (cycles) | Porosity | Coefficient of variation in outer layer thickness | Electric conductivity (×10⁶ m/Ω) | Average joint strength (N) | Welding stability | Peel mode |
| Comparative example | 5 | 7 | 34 | Peeled off at boundary between outer layer and base layer | 18 | 26.4% | 5.4 | 30.9 | 7.6 | ○ | Boundary |
| | 6 | 14 | 32 | Peeled off at boundary between outer layer and base layer | 18.1 | 28.3% | 6.3 | 30.2 | 5.9 | ○ | Boundary |

Figure 9:
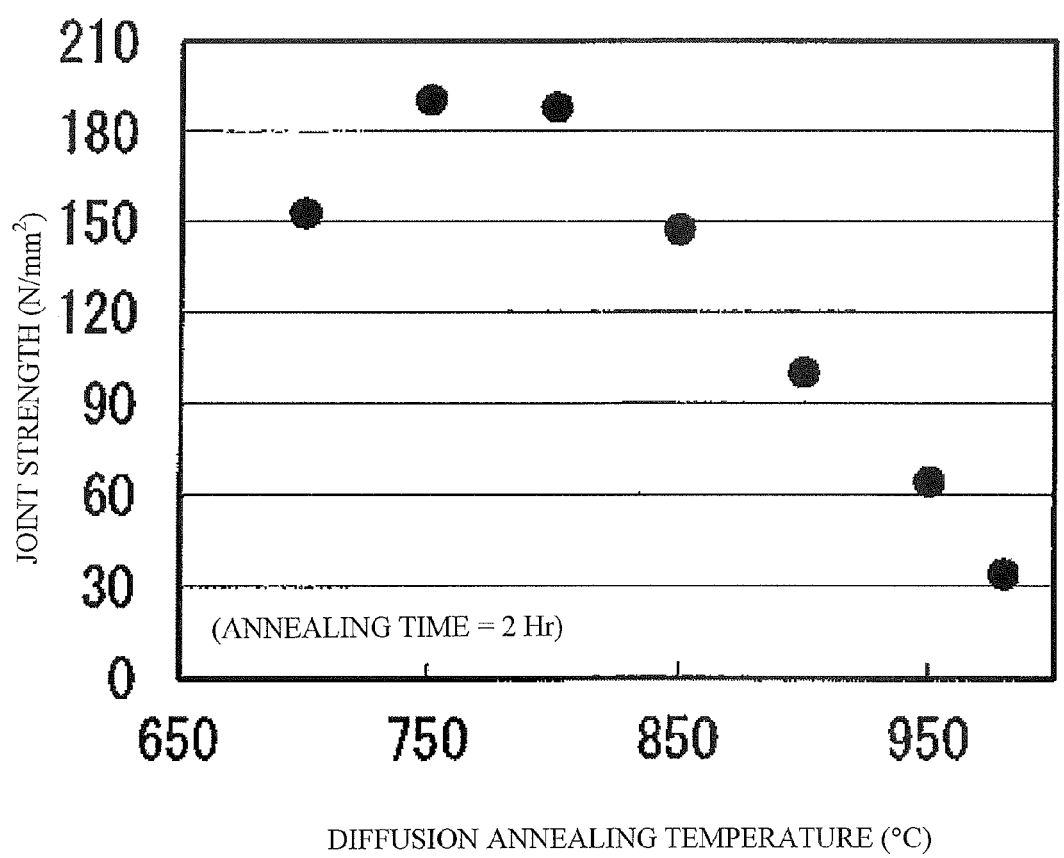
FIG. 9 is a graph showing the relationship between diffusion annealing temperature (annealing time is constant, being 2 hours) and joint strength.
Figure 10:
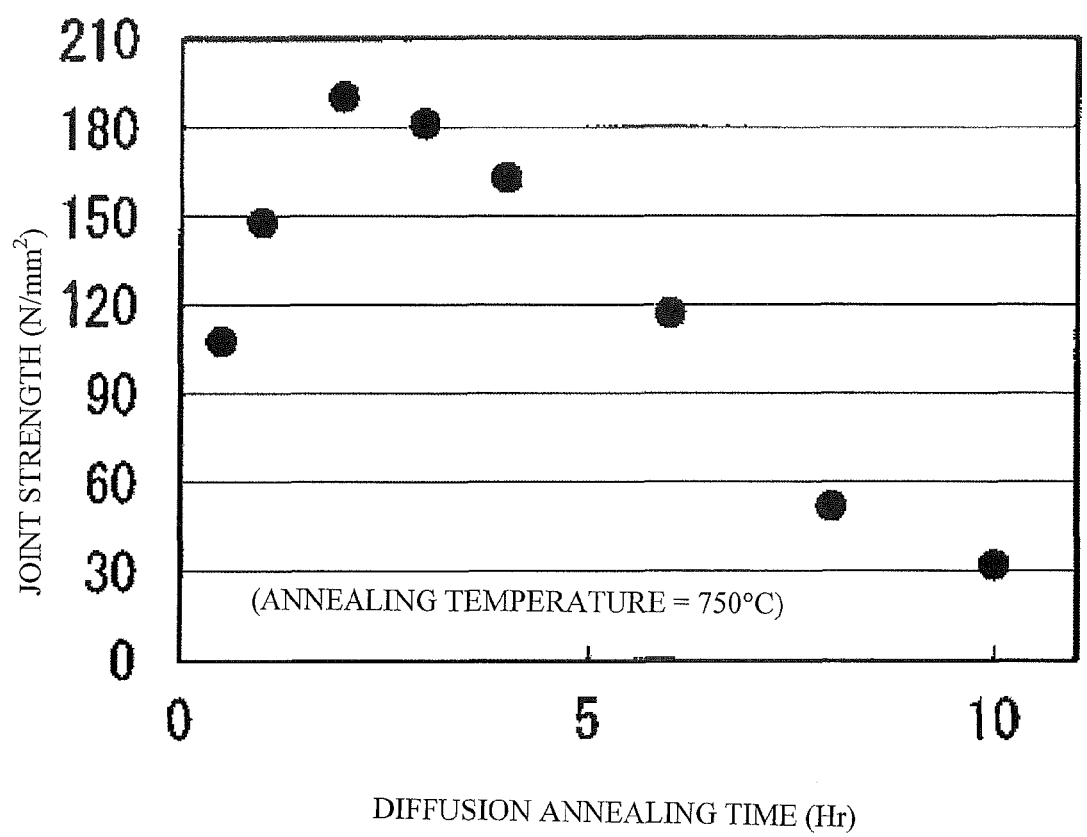
FIG. 10 is a graph showing the relationship between diffusion annealing time (annealing temperature is constant, being 750° C.) and joint strength.

FIGS. 9 and 10 show the relationships between the joint strength and the diffusion annealing temperature and time.

As shown in Table 4 and FIG. 9, the joint strength increases with the increase in diffusion treatment temperature; however, when the temperature exceeds 800° C., the joint strength inversely decreases. On the other hand, it can be seen that the joint strength decreases with heat treatment time of 2 hours being the peak as shown in Table 4 and FIG. 10. From these graphs, it can be seen that high joint strength can be achieved at a stage immediately after diffusion heat treatment under a condition that a test specimen is held at a temperature not lower than 650° C. and not higher than 975° C. for a time period not shorter than 10 minutes and not longer than 8 hours. Also, it can be seen that if the conditions specified in the production method of the present invention are met, the bend test result, the porosity, the coefficient of variation in outer layer thickness, and the spot weldability of the specimen subjected to cold rolling—annealing are good.

Example 3

To investigate an influence of hot rolling temperature and draft at the time of joint rolling on the adhesiveness, a plate (100 mm×80 mm×2 mm) consisting of oxygen-free pure Cu (C1020) and plates (100 mm×80 mm×1 mm) each consisting of pure Ni (JIS NW2201) were prepared. The joint surfaces of these plates were ground, and were subjected to degreasing treatment. Thereafter, in the order of the pure Ni plate, the pure Cu plate, and the pure Ni plate, the surfaces of 100 mm×80 mm were lapped and laminated. These plates were joined by electron beam welding in the state in which the plates were fixed with clamps so that the portion to be joined did not shift horizontally, whereby a laminated roll base metal was prepared. The laminated roll base metal was subjected to joint rolling at various hot rolling temperatures (the heating time was evenly 30 minutes) and drafts given in Table 5, and thereafter was subjected to diffusion annealing at 950° C. for 30 minutes, whereby specimens were obtained.

<Evaluation of Adhesiveness>

Evaluation of adhesiveness was performed by the T-type peeling test. Specifically, a wedge was driven to between the boundary surfaces of the Ni layer and the Cu layer of test specimen to forcedly peel the Ni layer from the Cu layer, the end portions of the layers were grasped and pulled in the direction opposite to each other, and the strength (peel strength) at the peeling time was determined.

Figure 11:
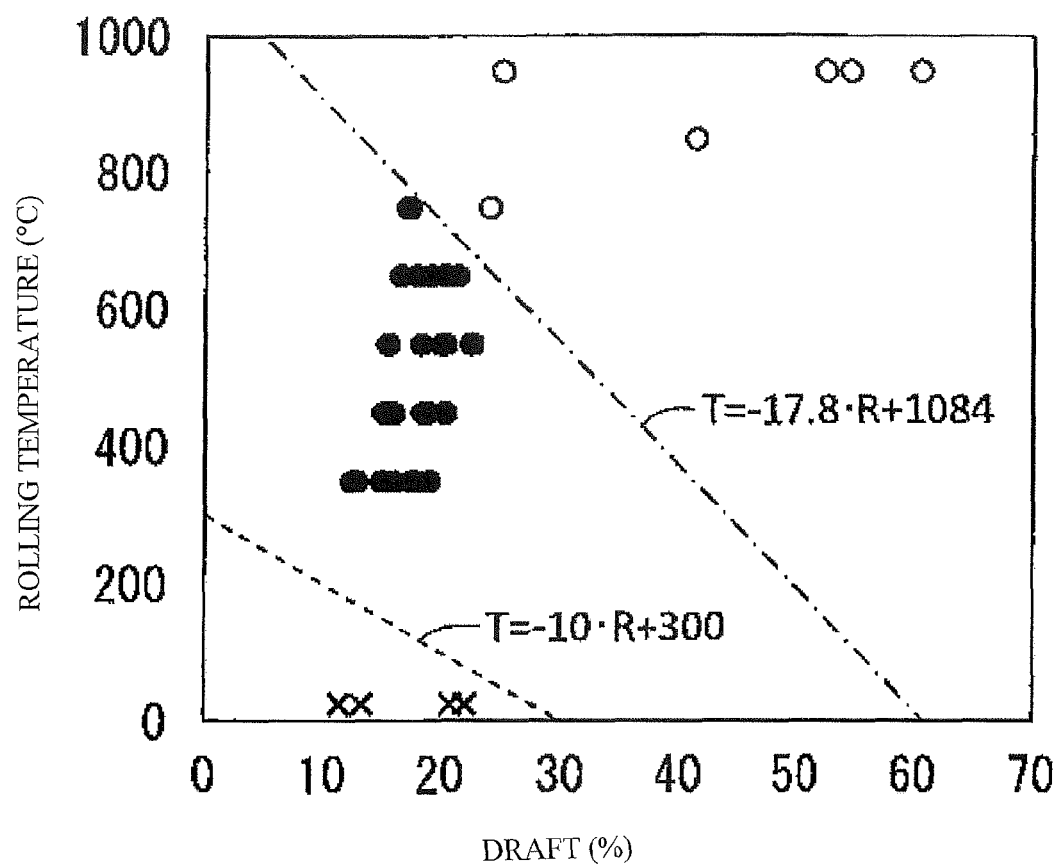
FIG. 11 is a graph showing the relationship between rolling temperature and draft.

The determination results are shown in Table 5 and FIG. 11. In Table 5, concerning the "judgment", "x" indicates that the peel strength was lower than 4 N/mm, and peeling-off occurred in the subsequent hot rolling. "○" and "◉" indicate that there did not arise a problem of peeling-off and the like in hot rolling. In particular, "◉" indicates that during the test, the Ni plate ruptured, and Cu adhered onto the surface of the peeled Ni layer, that is, the joint strength exceeded the material strength of Cu, so that the joint strength was especially high.

TABLE 5

| Classification | | Rolling temperature (° C.) | Draft (%) | Formula (1) | Formula (2) | Peel strength (N/mm) | Judgment |
|---|---|---|---|---|---|---|---|
| Example embodiment of the present invention | 29 | 350 | 16.0 | ○ | X | 16.75 | ○ |
| | 30 | 350 | 17.4 | ○ | X | 16.88 | ○ |
| | 31 | 350 | 12.9 | ○ | X | 13.09 | ○ |
| | 32 | 350 | 12.4 | ○ | X | 13.47 | ○ |
| | 33 | 350 | 14.9 | ○ | X | 18.7 | ○ |
| | 34 | 350 | 15.1 | ○ | X | 15.5 | ○ |
| | 35 | 350 | 19.0 | ○ | X | 13.8 | ○ |
| | 36 | 350 | 17.8 | ○ | X | 16.3 | ○ |
| | 37 | 450 | 15.9 | ○ | X | 19.2 | ○ |
| | 38 | 450 | 15.1 | ○ | X | 16.5 | ○ |
| | 39 | 450 | 18.4 | ○ | X | 16.3 | ○ |
| | 40 | 450 | 18.8 | ○ | X | 17.5 | ○ |
| | 41 | 450 | 20.3 | ○ | X | 16.9 | ○ |
| | 42 | 450 | 20.2 | ○ | X | 17.4 | ○ |
| | 43 | 550 | 15.4 | ○ | X | 14.2 | ○ |
| | 44 | 550 | 15.5 | ○ | X | 15.3 | ○ |
| | 45 | 550 | 18.2 | ○ | X | 12.8 | ○ |
| | 46 | 550 | 19.9 | ○ | X | 13.9 | ○ |
| | 47 | 550 | 22.4 | ○ | X | 15.2 | ○ |
| | 48 | 550 | 20.3 | ○ | X | 18.7 | ○ |
| | 49 | 550 | 22.5 | ○ | X | 15.3 | ○ |
| | 50 | 550 | 22.6 | ○ | X | 16 | ○ |
| | 51 | 650 | 16.5 | ○ | X | 15.5 | ○ |
| | 52 | 650 | 17.9 | ○ | X | 11.8 | ○ |
| | 53 | 650 | 20.2 | ○ | X | 15.4 | ○ |
| | 54 | 650 | 21.3 | ○ | X | 17.3 | ○ |
| | 55 | 650 | 19.0 | ○ | X | 18.8 | ○ |
| | 56 | 650 | 19.1 | ○ | X | 15.1 | ○ |
| | 57 | 750 | 24.0 | ○ | ○ | Unable to be peeled | ◉ |
| | 58 | 750 | 17.3 | ○ | X | 10.3 | ○ |
| | 59 | 750 | 17.1 | ○ | X | 10.5 | ○ |
| | 60 | 850 | 41.3 | ○ | ○ | Unable to be peeled | ◉ |
| | 61 | 950 | 25.0 | ○ | ○ | Unable to be peeled | ◉ |
| | 62 | 950 | 60.5 | ○ | ○ | Unable to be peeled | ◉ |
| | 63 | 950 | 54.5 | ○ | ○ | Unable to be peeled | ◉ |
| | 64 | 950 | 52.4 | ○ | ○ | Unable to be peeled | ◉ |

TABLE 5-continued

| Classification | | Rolling temperature (° C.) | Draft (%) | Formula (1) | Formula (2) | Peel strength (N/mm) | Judgment |
|---|---|---|---|---|---|---|---|
| Comparative example | 7 | 25 | 11.4 | X | X | 1.58 | X |
| | 8 | 25 | 13.3 | X | X | 2.07 | X |
| | 9 | 25 | 22.1 | X | X | 2.1 | X |
| | 10 | 25 | 20.8 | X | X | 2.38 | X |

Formula (1): $T \geq -10 \cdot R + 300$
Formula (2): $T \geq -17.8 \cdot R + 1084$ As shown in Table 5 and FIG. 11, in comparative examples 7 to 10 in which the rolling temperature and draft did not satisfy the relationship of Formula (1), the peel strength remained taking a low value. On the other hand, in example embodiments of the present invention 29 to 64 in which the rolling temperature and draft satisfied the relationship of Formula (1), a sufficient peel strength was attained. In particular, in example embodiments of the present invention 57 and 60 to 64 in which the rolling temperature and draft also satisfied the relationship of Formula (2), the joint strength was so high as to exceed the material strength of Cu.

Example 4

A plate (120 mm×100 mm×24 mm) consisting of oxygen-free pure Cu (C1020) and plates (120 mm×100 mm×9 mm) each consisting of pure Ni (JIS NW2201) were prepared. The joint surfaces of these plates were ground, and were subjected to degreasing treatment. Thereafter, in the order of the pure Ni plate, the pure Cu plate, and the pure Ni plate, the surfaces of 120 mm×100 mm were lapped and laminated. These plates were joined by electron beam welding in the state in which the plates were fixed with clamps so that the portion to be joined did not shift horizontally, whereby a laminated roll base metal was prepared. The obtained laminated roll base metal was heated at 850° C. for 30 minutes, and thereafter was subjected to joint rolling at a draft of 40%. After being diffusion-annealed at 800° C. for two hours, the base metal was hot-rolled to 4-mm thickness. After being descaled, the base metal was cold-rolled to about 0.1-mm thickness, and was subjected to bright annealing at 800° C.

The obtained annealed material was made a specimen by cutting a 4 mm-wide slit therein. The side face of the specimen was coated with Ni. The Ni coating was performed by using a hoop plating device (chemical liquid: nickel sulfate 250 g/l+hydrochloric acid 100 ml/l, current density: 2 A/m², electrolysis time: 0.5 to 15 seconds). Successively, the specimen was stored in a temperature and humidity controlled chamber having a humidity of 80% and a temperature of 50° C. for 48 hours, and thereafter the side end face on which Cu was exposed was observed under an optical microscope. Also, the Ni plating thickness of the material having been plated with Ni was identified by observing the cross section perpendicular to the plated surface of the material with a SEM-EDX. The observation results are given in Table 6.

TABLE 6

| Classification | | Plating | Electrolysis time (sec) | Ni plating thickness (μm) | Discoloration (corrosion) of Cu portion |
|---|---|---|---|---|---|
| Example embodiment of the present invention | 65 | Done | 0.5 | 0.2 | Not occurred |
| | 66 | Done | 1.0 | 1.0 | Not occurred |
| | 67 | Done | 2.0 | 1.5 | Not occurred |
| | 68 | Done | 5.0 | 4.0 | Not occurred |
| Comparative example | 11 | Not done | — | Not plated | Occurred |
| | 12 | Done | 15.0 | 12.0 | Not occurred |

As given in Table 6, in the above-described temperature and humidity controlled environment, on the end face of the material having not been plated with Ni, corrosion occurred. A portion in which corrosion advanced was of greenish blue or black. Generally, copper carries out the reaction described below, and it is said that the greenish blue color is developed by this reaction. It is thought that in this comparative example as well, this reaction had occurred.

$$2Cu + O_2 + CO_2 + H_2O \rightarrow CuCO_3 \cdot Cu(OH)_2$$

On the other hand, for the materials of example embodiments of the present invention 65 to 68, corrosion was not recognized on the end face of material. The reason for this is thought to be that the above-described reaction could be suppressed by Ni with which the Cu surface was coated.

In comparative example 12, corrosion did not occur because the Ni plating thickness is as large as 12 μm. However, the electrolysis required 15 seconds, so that the productivity was low, which resulted in the increase in cost.

Therefore, it could be seen that when the clad lead material of the present invention is used for a laminate battery, in order to eliminate the occurrence of solution leakage and the like, it is useful to plate Cu on the cut surface of clad material with Ni.

Example 5

A part of the heat-rolled plate obtained in Example 3 was subjected to cold rolling—annealing, and thereafter was subjected to a bend test to examine the joint strength. The test specimens used were those of comparative example 9 (joint rolling temperature: normal temperature), and example embodiments of the present invention 45 (joint rolling temperature: 550° C.) and 55 (joint rolling temperature: 750° C.) described in Table 5, and these three test specimens were made comparative example 13 and example embodiments of the present invention 69 and 70. After being descaled, the test specimens were cold-rolled to 1-mm thickness. At this time, in comparative example 13, the joint strength was low, and peeling-off occurred between the Ni and Cu layers during cold rolling, so that a bend test could not be conducted. The test specimens of example embodiments of the present invention 69 and 70 were subjected to bright annealing at 800° C. for 120 seconds, and were subjected to a 90° bend test with the bend radius being 2 mm and a bend-and-return test.

In both of example embodiments of the present invention 69 and 70, after the bend test, peeling-off was not observed visually and under an optical microscope (magnification: 50×). In example embodiment of the present invention 69 in which the joint rolling was performed at 550° C., after the bend-and-return test, peeling-off was not observed visually; however, peeling-off was observed in some portion under the optical microscope. The peeling-off observed under the optical microscope was slight, and was in the allowable range. In example embodiment of the present invention 70 in which the joint rolling was performed at 750° C., it can be seen that after the bend-and-return test, peeling-off was not observed visually and under the optical microscope, and the joint strength was excellent.

INDUSTRIAL APPLICABILITY

The clad material of the present invention is provided with both of excellent corrosion resistance against electrolytic solution and high electric conductivity, has excellent weldability in resistance welding, and moreover does not peel off at the clad boundary at the time of bending work. Therefore, the clad material of the present invention is useful for being used as an electrode lead material for a secondary battery used in various technical fields such as hybrid vehicles, power tools, power assisted bicycles, cellular phones, and personal computers.

What is claimed is:

1. A clad material which comprises outer layers each consisting of Ni or Ni alloy and a base layer consisting of Cu or Cu alloy, wherein the clad material having a total thickness of 0.2 mm or smaller, and wherein peeling-off at a clad boundary is not recognized in cross section observation made after the clad material has been subjected to a 90° reverse bend test ten times, and the number of reverse bend cycles before rupture is 17 cycles or more,
wherein a coefficient of variation in the outer layer thickness is 5 or less.

2. A clad material which comprises outer layers each consisting of Ni or Ni alloy and a base layer consisting of Cu or Cu alloy, wherein the clad material having a total thickness of more than 0.2 mm, and wherein peeling-off at a clad boundary is not recognized in visual cross section observation made after the clad material has been subjected to a 90° bend test with a bend radius being two times the clad material thickness,
wherein a coefficient of variation in the outer layer thickness is 5 or less.

3. A clad material comprising outer layers each consisting of Ni or Ni alloy and a base layer consisting of Cu or Cu alloy, wherein a peel strength of Ni—Cu is 4 N/mm or higher,
wherein a coefficient of variation in the outer layer thickness is 5 or less.

4. The clad material according to claim 1, wherein a porosity of the clad material is 20% or less.

5. The clad material according to claim 1, wherein a coefficient of variation in outer layer thickness is 4 or less.

6. The clad material according to claim 1, wherein the clad material comprises a cut strip, the cut strip having a cut surface, a Ni layer other than said outer Ni layer having a thickness of 10 μm or smaller is formed on the cut surface of the clad material.

7. The clad material according to claim 2, wherein a porosity of the clad material is 20% or less.

8. The clad material according to claim 3, wherein a porosity of the clad material is 20% or less.

9. The clad material according to claim 2, wherein a coefficient of variation in outer layer thickness is 4 or less.

10. The clad material according to claim 3, wherein a coefficient of variation in outer layer thickness is 4 or less.

11. The clad material according to claim 2, wherein the clad material comprises a cut strip, the cut strip having a cut surface, a Ni layer other than said outer Ni layer having a thickness of 10 μm or smaller is formed on the cut surface of the clad material.

12. The clad material according to claim 3, wherein the clad material comprises a cut strip, the cut strip having a cut surface, a Ni layer other than said outer Ni layer having a thickness of 10 μm or smaller is formed on the cut surface of the clad material.

* * * * *